US012184015B2

(12) United States Patent
Konttinen et al.

(10) Patent No.: US 12,184,015 B2
(45) Date of Patent: Dec. 31, 2024

(54) CABLES WITH CONNECTOR ASSEMBLIES, FILTER UNITS CONFIGURED TO RELEASABLY COUPLE TO THE CONNECTOR ASSEMBLIES AND RELATED METHODS

(71) Applicant: CommScope Italy S.R.L., Agrate Brianza (IT)

(72) Inventors: Jarno Konttinen, Oulu (FI); Tero Kamarainen, Oulu (FI); Marko Uusitalo, Oulu (FI)

(73) Assignee: Outdoor Wireless Networks LLC, Claremont, NC (US)

( * ) Notice: Subject to any disclaimer, the term of this patent is extended or adjusted under 35 U.S.C. 154(b) by 312 days.

(21) Appl. No.: 17/905,950

(22) PCT Filed: Mar. 10, 2021

(86) PCT No.: PCT/EP2021/056042
§ 371 (c)(1),
(2) Date: Sep. 9, 2022

(87) PCT Pub. No.: WO2021/180784
PCT Pub. Date: Sep. 16, 2021

(65) Prior Publication Data

US 2023/0104414 A1 Apr. 6, 2023

Related U.S. Application Data

(60) Provisional application No. 62/989,248, filed on Mar. 13, 2020.

(30) Foreign Application Priority Data

Sep. 8, 2020 (IT) ........................ 102020000021265

(51) Int. Cl.
*H01R 24/40* (2011.01)
*H01P 1/201* (2006.01)
(Continued)

(52) U.S. Cl.
CPC ............. *H01R 24/40* (2013.01); *H01P 1/201* (2013.01); *H01R 9/0521* (2013.01); *H01R 13/622* (2013.01); *H01R 2103/00* (2013.01)

(58) Field of Classification Search
CPC .... H01R 24/40; H01R 9/0521; H01R 13/622; H01R 2103/00; H01R 24/50; H01R 13/111; H01P 1/201
See application file for complete search history.

(56) References Cited

U.S. PATENT DOCUMENTS

| | | | | |
|---|---|---|---|---|
| 3,622,939 A * | 11/1971 | Forney, Jr. | ........... | H01R 9/0521 439/322 |
| 10,637,186 B2 * | 4/2020 | Urtz, Jr. | ............... | H01R 24/525 |
| 2018/0006420 A1 | 1/2018 | Urtz | | |

OTHER PUBLICATIONS

International Search Report and the Written Opinion of the International Searching Authority corresponding to International Patent Application No. PCT/EP2021/056042 (14 pages) (mailed Jun. 2, 2021).

* cited by examiner

*Primary Examiner* — Briggitte R. Hammond
(74) *Attorney, Agent, or Firm* — Myers Bigel, P.A.

(57) ABSTRACT

The present invention provides target devices such as filter units with at least one receiving channel with a stop surface that is electrically conductive and at least one cable with a connector assembly on a first end portion. The connector assembly includes a first member with an open channel. The first member is coupled to the end portion of the outer conductor with the free end of the inner conductor and the end portion of the dielectric extending through the open (Continued)

channel to reside forward of the first member. The first member resides in a respective one of the at least one receiving channel against the stop surface. The connector assembly also includes second member with an open channel. The second member is slidably coupled to the first end portion of the at least one cable and presses the first member against the stop surface.

20 Claims, 10 Drawing Sheets

(51) Int. Cl.

| | |
|---|---|
| ***H01R 9/05*** | (2006.01) |
| ***H01R 13/622*** | (2006.01) |
| ***H01R 103/00*** | (2006.01) |

CABLES WITH CONNECTOR ASSEMBLIES, FILTER UNITS CONFIGURED TO RELEASABLY COUPLE TO THE CONNECTOR ASSEMBLIES AND RELATED METHODS

FIELD OF THE INVENTION

The present invention relates generally to connector assemblies that are particularly suitable for use with filter units for cellular communications systems.

BACKGROUND

Wireless base stations are well known in the art and typically include, among other things, baseband equipment, radios and antennas. The antennas are often mounted to a support structure such as a tower or other elevated structure such as a pole, rooftop, wall, water tower or the like. Typically, multiple antennas are mounted on the support structure, and one or more baseband units and radios can be connected to each antenna. Each antenna provides cellular service to a defined coverage area or "sector."

FIG. 1 is a highly simplified, schematic diagram that illustrates a conventional cellular base station 10. As shown in FIG. 1, the cellular base station 10 includes an antenna tower 30 and an equipment enclosure 20 that is located at the base of the antenna tower 30. A plurality of baseband units 22 and radios 24 are located within the equipment enclosure 20. Each baseband unit 22 is connected to a respective one of the radios 24 and is also in communication with a backhaul communications system 44. Three sectorized antennas 32 (labelled antennas 32-1, 32-2, 32-3) are located at the top of the antenna tower 30. Three cables 34 (which are bundled together in FIG. 1 to appear as a single cable) connect the radios 24 to the respective antennas 32. Each cable 34 may be connected to a filter unit 50 (labeled as filter units 50-1, 50-2, 50-3) and both the transmit and receive signals for each radio 24 may be carried on a single (coaxial and/or fiber optic) cable 34. In many cases, the radios 24 are located at the top of the tower 30 instead of in the equipment enclosure 20 in order to reduce signal transmission losses. The filter units 50 may be located, for example, within or adjacent the antennas 32.

Cellular base stations typically use directional antennas 32 such as phased array antennas to provide increased antenna gain throughout a defined coverage area. A typical phased array antenna 32 may be implemented as a linear array of radiating elements mounted on a panel, with perhaps 5-20 radiating elements per linear array. Typically, each radiating element is used to (1) transmit radio frequency ("RF") signals that are received from a transmit port of an associated radio 24 and (2) receive RF signals from mobile users and feed such received signals to the receive port of the associated radio 24. Filter units such as duplexers are typically used to connect the radio 24 to each respective radiating element of the antenna 32. A "duplexer" refers a well-known type of multi-port filter assembly that is used to connect both the transmit and receive ports of a radio 24 to an antenna 32 or to a radiating element of multi-element antenna 32. Duplexers are used to isolate the RF transmission paths to the transmit and receive ports of the radio 24 from each other while allowing both RF transmission paths access to the radiating element of the antenna 32, and may accomplish this even though the transmit and receive frequency bands may be closely spaced together.

SUMMARY OF THE INVENTION

Embodiments of the present invention provide connector assemblies that releasably couple cables to filter units without requiring a soldered interface to a respective housing of the filter units.

Embodiments of the present invention are directed to cables that comprise connector assemblies that releasably couple to a receiving channel of a housing using a threaded member thereby providing a solderless connection to the housing.

Embodiments or the present invention provide housings having at least one threaded channel that releasably couples to a respective threaded member of a connector assembly.

The filter unit in any of the embodiments of the aspects of the present invention can be a duplexer, a diplexer, a combiner and/or as other filters for cellular communications systems and other applications.

The connector assemblies may be useful for other applications.

Embodiments of the present invention are directed to filter units that include a housing having a receiving channel with a stop surface that is electrically conductive; and a cable having a connector assembly on a first end portion. The first end portion has an end portion of an inner conductor with a free end, an end portion of an outer conductor that terminates a distance rearward of the end portion of the inner conductor, and an end portion of a dielectric residing between the inner conductor and the outer conductor. The connector assembly includes: a first member with an open channel and a second member. The first member is coupled to the end portion of the outer conductor with the free end of the inner conductor and the end portion of the dielectric extending through the open channel to reside forward of the first member. The first member abuts the stop surface. The second member has an open channel that slidably receives the cable. The second member is detachably coupled to the first member and at least partially resides in the receiving channel. When fully assembled to the housing, the second member presses the first member against the stop surface.

The first member can include a first segment with an annular flat end face and a second segment comprising a neck. The second member can define an annular space about the end portion of the outer conductor. The neck of the first member can be sized and configured to reside in the annular space.

The second member can have a first segment with external threads. The at least one receiving channel can have an internal surface with threads that can threadably engage the external threads of the first segment of the second member to thereby define a releasably detachable solderless coupling of the second member to the receiving channel.

The first member and the second member of the connector assembly can be electrically conductive.

The first member and the second member can be formed of brass, optionally the first member can also include silver plating.

The filter unit can also include a center conductor in the housing that is aligned with the receiving channel and that can be electrically and physically connected to the free end of the inner conductor to thereby define a solderless connection therebetween.

The center conductor can have a longitudinally extending body with opposing first and second end portions. The first end portion can have a channel with longitudinally and radially extending slits that are circumferentially spaced apart.

The channel of the center conductor can terminate in the longitudinally extending body before the second end portion.

The filter unit can also include an annular dielectric in the housing, surrounding at least a portion of the center conductor.

The second member can have first, second and third segments surrounding the open channel. The first segment can have external threads that resides over the end portion of the outer conductor. The second segment can have a plurality of circumferentially spaced apart flat clamping surfaces. The third segment can have a cylindrical shoulder residing over at least a part of an outer jacket of the at least one cable.

The stop surface can reside at an inner end portion of the receiving channel. The stop surface can surround an open longitudinally extending channel that extends a distance inwardly thereof to position the free end of the inner conductor inside a center conductor held therein.

Other embodiments are directed to a cable assembly. The cable assembly includes a coaxial cable having an inner conductor, an outer conductor, a dielectric between the inner conductor and the outer conductor and an outer jacket surrounding the outer conductor over a length of the coaxial cable. The coaxial cable has an end portion configured with an end portion of an inner conductor having an exposed free end, an end portion of an outer conductor terminating a distance rearward of the end portion of the inner conductor, and an end portion of a dielectric residing between the inner conductor and the outer conductor terminating a distance rearward of the end portion of the inner conductor. The cable assembly also includes a connector assembly coupled to the end portion of the coaxial cable. The connector assembly can include: a first member with an open channel, the first member coupled to the end portion of the outer conductor with the free end of the inner conductor and the end portion of the dielectric extending through the open channel to reside forward of the first member; and a second member with an open channel that slidably receives the first end portion of the at least one cable and moves axially relative to the first member between installed and uninstalled positions.

The first member can have a first segment with an annular flat end face and a second segment comprising a neck. The second member can define an annular space about the end portion of the outer conductor. The neck of the first member can be sized and configured to reside in the annular space.

The second member can have a first segment with external threads to thereby define a releasably detachable solderless coupling of the second member to a threaded receiving channel in a target device and that forces the first member against a stop surface therein.

The first member and the second member of the connector assembly can be electrically conductive.

The first member and the second member can be formed of brass. Optionally the first member can also have a silver plating.

The second member can have first, second and third segments surrounding the open channel. The first segment can have external threads and reside over the end portion of the outer conductor. The second segment can have a plurality of circumferentially spaced apart flat clamping surfaces. The third segment can have a cylindrical shoulder enclosing a segment of the outer jacket of the cable.

Yet other embodiments are directed to methods of attaching a cable to a target device. The methods include: providing a cable with a connector assembly on an end portion thereof, the connector assembly having a first member coupled to an outer conductor and defining an open channel that surrounds an end portion of a dielectric and an end portion of an inner conductor with a free end of the inner conductor extending forward thereof, and also having a second member slidably coupled to the end portion of the cable. The methods also include: inserting the first member into a receiving channel of a target device; advancing the second member toward the first member in the receiving channel; and forcing the second member to abut the first member and press the first member against a stop surface in the receiving channel to define an electrical ground connection with the target device.

The receiving channel can have an inner surface with threads and the second member can have external threads. The advancing can be carried out to threadably engage the threads of the receiving channel and the threads of the second member to couple the second member to the target device and force the second member to abut the first member.

The target device can be a filter unit of a communications system.

DETAILED DESCRIPTION

Figure 1:
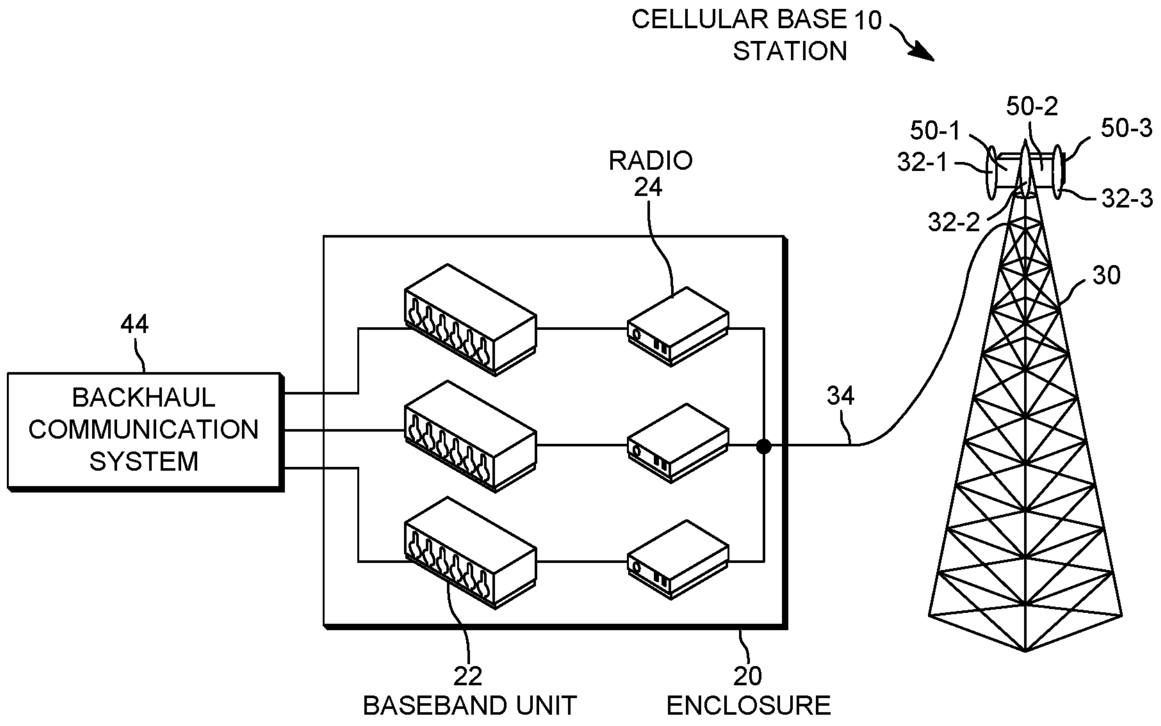
(PRIOR ART) FIG. 1
FIG. 1 is a highly simplified, schematic diagram of a conventional cellular base station.

The present invention is described more fully hereinafter with reference to the accompanying drawings, in which some embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. The terms "FIG." and "Fig." are used interchangeably with the word "Figure" in the specification and/or figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures.

It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

The term "about" means that the noted parameter can vary somewhat from the stated number, typically by +/−20%.

Figure 2:
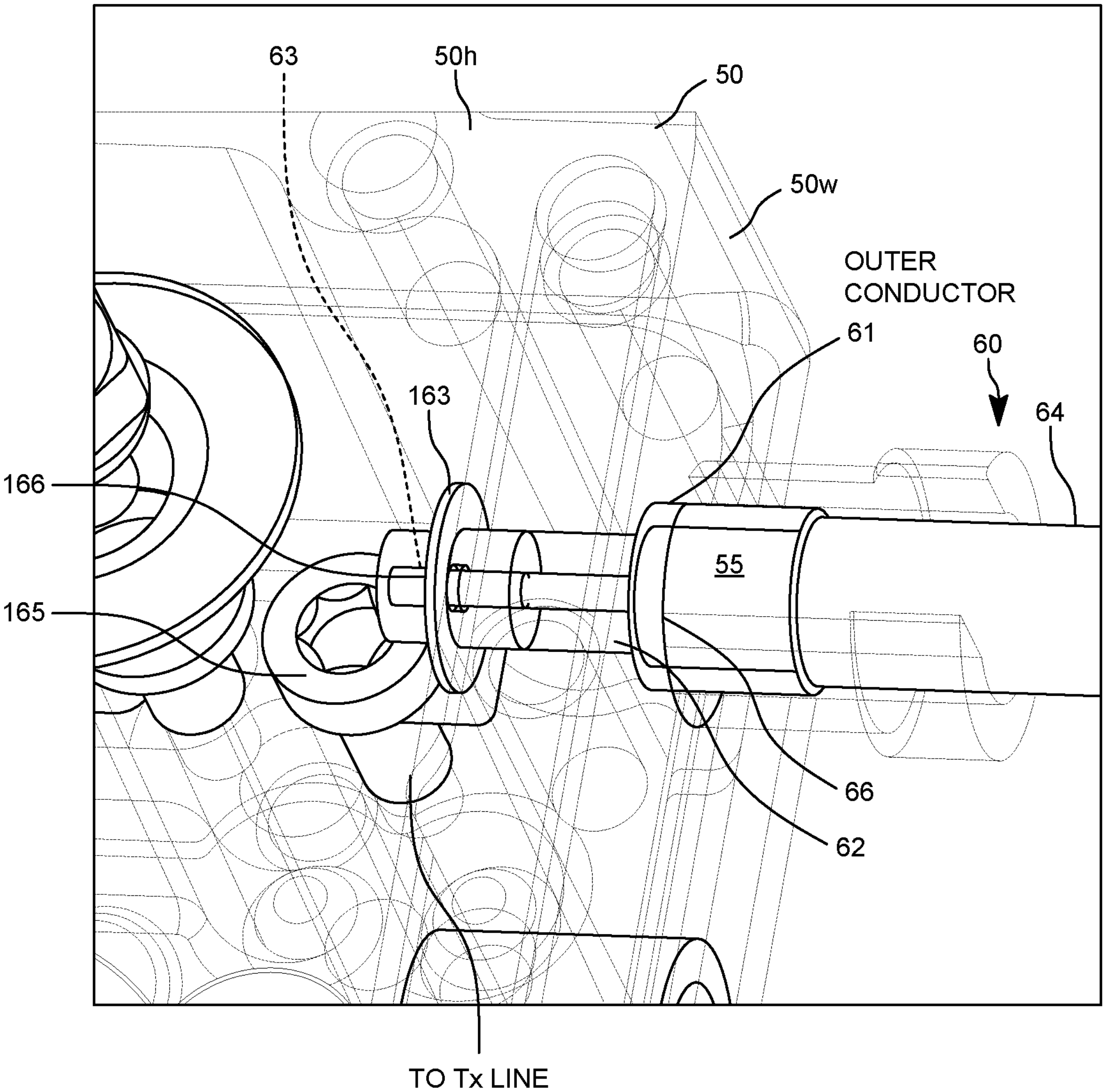
(PRIOR ART) FIG. 2
FIG. 2 is an enlarged partial perspective view of a prior art filter unit and coaxial cable with two soldered connection interfaces for one end portion of the cable.
Figure 3:
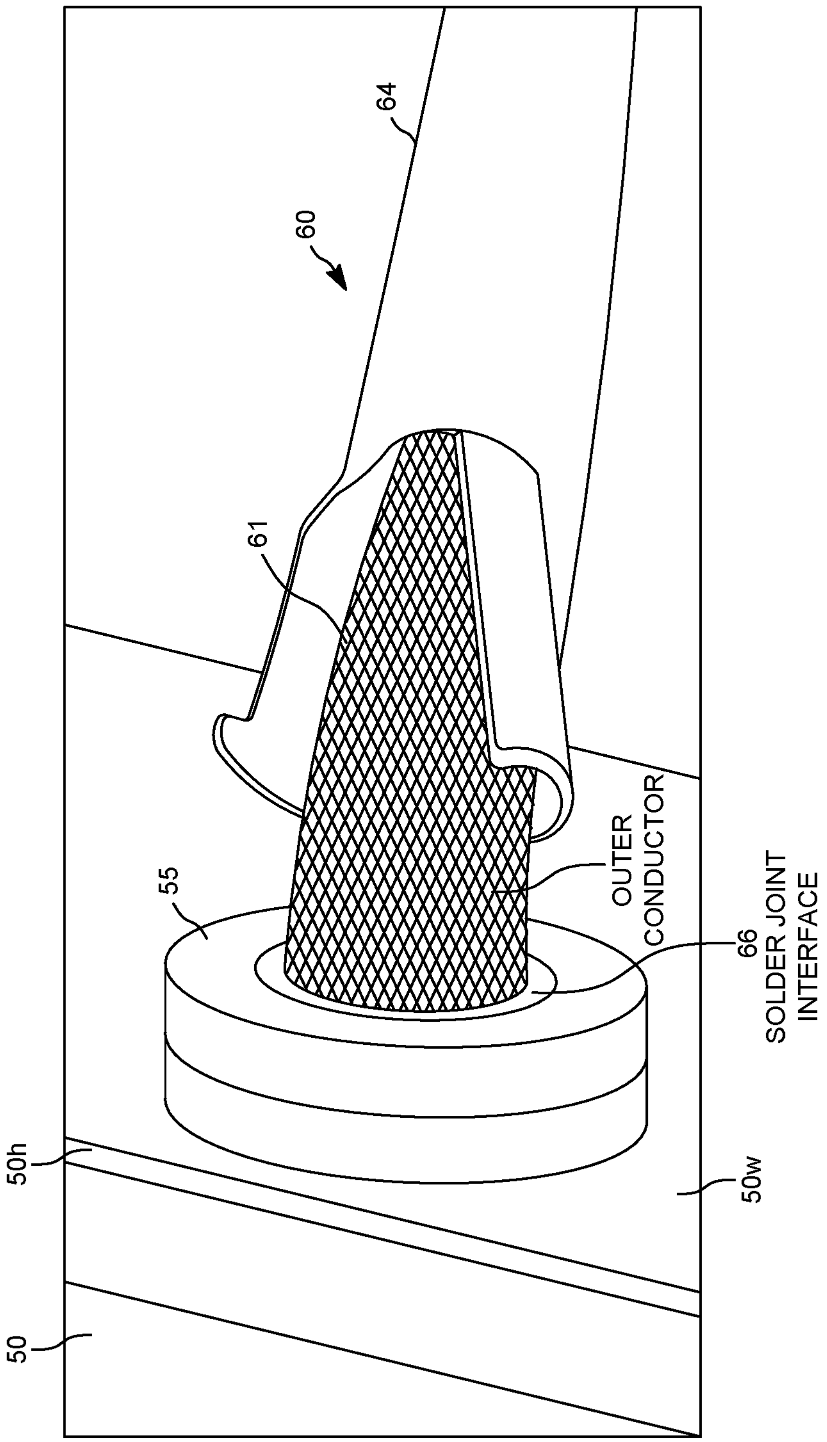
(PRIOR ART) FIG. 3
FIG. 3 is a greatly enlarged partial perspective view of a prior art coaxial cable with the outer conductor soldered to the housing.

FIG. 2 illustrates a prior art coaxial cable 60 with an outer conductor 61 soldered at a solder interface 66 to an outer wall 50*w* of a housing 50*h* of a filter unit 50. The solder interface 66 is typically provided by heating solder paste positioned in a cylindrical coupler 55 attached to the housing 50*h* that extends out of the outer wall 50*w* of the housing. FIG. 3 is an enlarged partial view of the soldered interface 66 of the outer conductor 61 and outer wall 50*w*. FIG. 2 also shows that the inner (center) conductor 63 is soldered at a solder interface 166 inside the housing 50*h* to a washer 163 that is coupled to a conductive (e.g., copper) screw 165 to connect to a transmission line. Once the soldered interface joints 66, 166 are made and intact, it is difficult to remove the cable 60 from the housing 50*h*. Heat must be applied to the soldered interface joints 66, 166 (indicated by arrows in FIG. 2), typically concurrently and at least the soldered interface 66 of the outer conductor 61 may require an undesirable level of heat to melt the solder to be able to release the cable 60 from the housing 50*h*.

Figure 4:
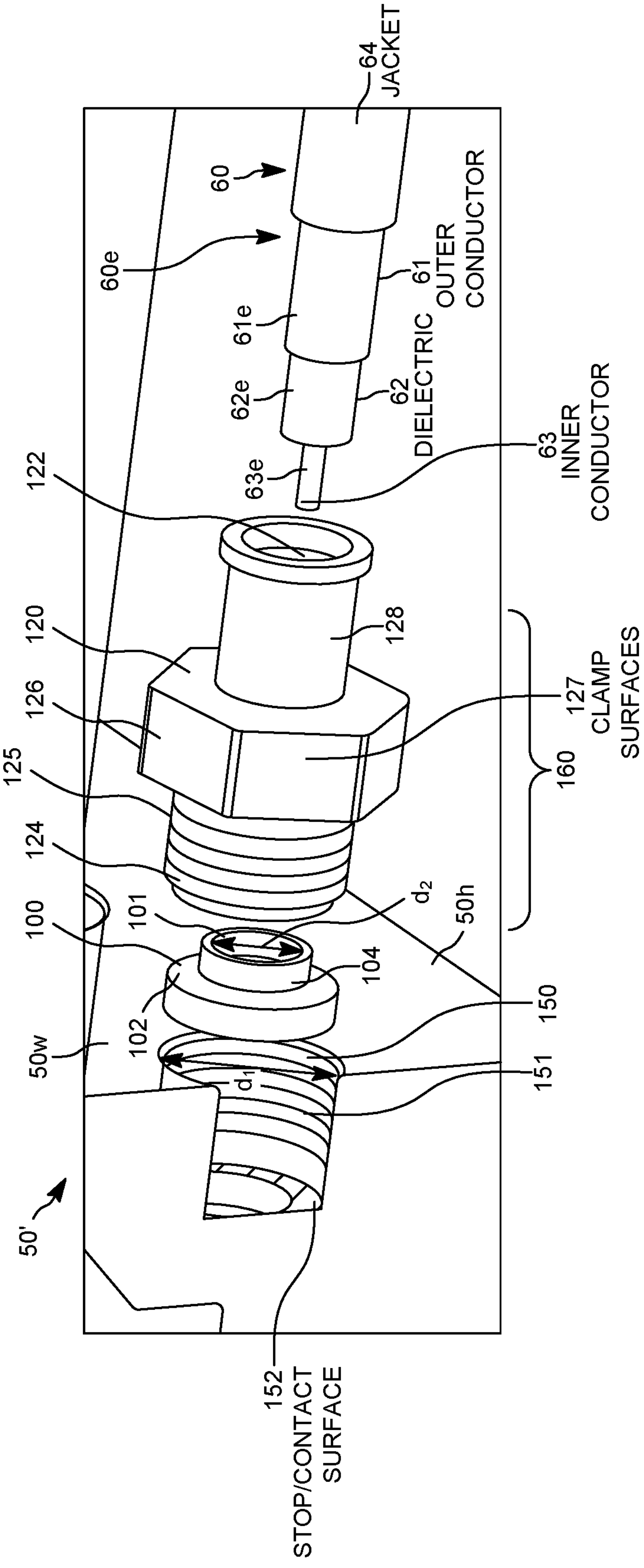
FIG. 4 is an enlarged exploded view of a cable comprising a connector assembly for coupling to a housing according to embodiments of the present invention.
Figure 5:
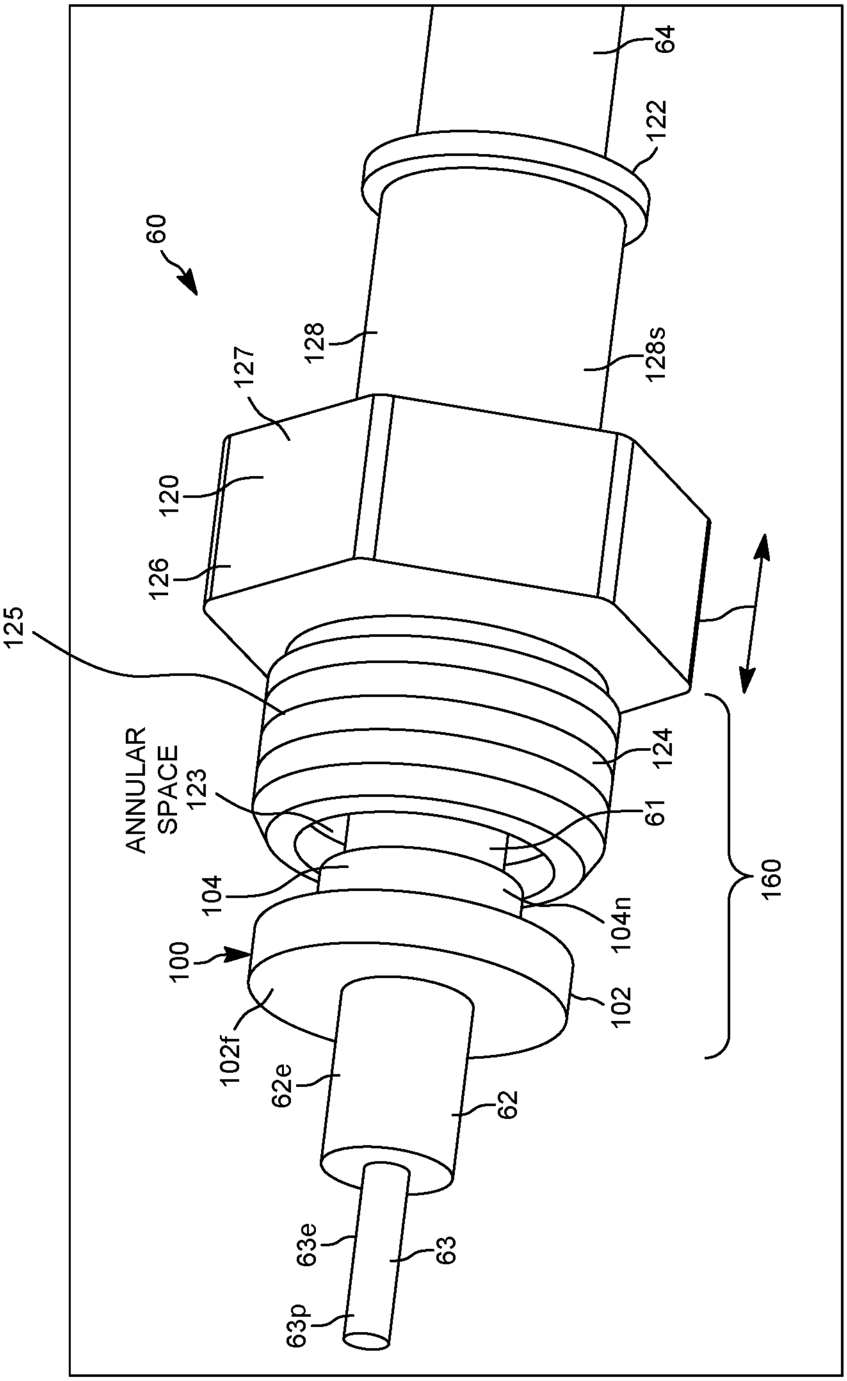
FIG. 5 is an assembled view of the connector assembly shown in FIG. 4 according to embodiments of the present invention.

Referring to FIGS. 4 and 5, embodiments of the present invention provide a cable 60 with an end portion 60*e* and comprising a connector assembly 160 that attaches to the cable 60 and that is configured to provide a releasably engageable, solderless connection to a housing 50*h*, such as a housing of a filter assembly.

The term "filter assembly" and "filter assemblies" are used interchangeably with the terms "filter unit" and "filter units", respectively, herein. The filter assemblies can be duplexers, diplexers, combiners and/or as other filters for cellular communications systems and other applications.

As shown, the cable 60 is a coaxial cable with an outer conductor 61, a dielectric 62 and an inner conductor 63. The inner conductor 63 can be sufficiently rigid to define a self-supporting shape with a free exposed end portion 63*e* that extends a distance beyond the dielectric 62 and the outer conductor 61. The inner conductor 63 and the dielectric 62 can have respective end portions 63*e*, 62*e* that extend a distance beyond an end portion 61*e* of the outer conductor 61 and the inner conductor 63 can extend a distance beyond the dielectric 62. The cable 60 can have an external jacket 64 that can terminate a distance rearward of the end portion 61*e* of the outer conductor 61. The outer conductor 61 can have a braided configuration (FIG. 3).

It is contemplated that the connector assemblies 160, while particularly suitable for filter units, may also be suitable for other end use applications and/or other types of cables 60.

As shown, the connector assembly 160 comprises a first member 100 that releasably couples to a second member 120. The first member 100 can have an open and longitudinally extending through channel 101 that is aligned with, typically concentric with, the through channel 122 of the second member 120 and that is sized and configured to couple to the outer conductor 61 of the cable 60. That is, the first member 100 is sized and configured to attach to the outer conductor 61 of the cable 60 with end portions 62*e*, 63*e* of the dielectric 62 and inner conductor 63, respectively, extending through the channel 101 to reside a distance forward of the first member 100 (FIG. 5).

The first member 100 can be soldered to the outer conductor 61. A solder paste can be used to solder the first member 100 to the outer conductor 61 about an entire circumference thereof.

The longitudinally extending open through channel 122 of the second member 120 can be elongate and longer than the open through channel 101 of the first member 100. The second member 120 is not required to fixedly attach to the cable 60 and can be configured to "float" axially about the outer conductor 61 and/or jacket 64 relative to the first member 100 when not attached to (prior to assembly with) the housing 50*h* as shown by the axially extending arrows in FIG. 5.

As shown, the first member 100 can have a first segment 102 with a first outer diameter d1 that merges into a second segment 104 with a second outer diameter d2, with d2<d1, typically d2 is at least 20% less than d1. The second segment 104 can define a longitudinally or axially extending neck 104*n* that is slidably receivable into an annular space 123 between the outer conductor 61 and an end portion of the second member 120 and that faces the first member 100.

The first segment 102 of the first member 100 can have a flat annular end face 102*f* that can electrically and physically engage a stop surface 152 (FIGS. 4 and 7) of a channel 150 in the housing 50*h* of a target device, optionally a filter unit 50'. The stop surface 152 can be electrically conductive. The first member 100 can thus provide an electrical ground connection when assembled in the receiving channel 150 of the housing 50*h*.

The first member 100 and the second member 120 can comprise an electrically conductive material. For example, brass or a substrate with a conductive coating such as silver plated components or combinations thereof. In some particular embodiments, the first member 100 can be silver plated or coated brass while the second member 120 can comprise brass without requiring a silver plating or coating.

The second member 120 can comprise a first segment 124 on a first end portion with external threads 125. The second member 120 can comprise a second segment 126 that has a greater outer diameter than the first segment 124. The second member 120 can comprise a third segment 128 on an opposing end portion that extends a distance away from the second segment 126. The third segment 128 can be longer than the second segment 126 (the length dimension being in a longitudinally or axially extending direction). The third segment 128 can have an outer diameter over at least a major portion of its length that is less than maximal outer diameters of the first and second segments 124, 126, respectively.

The third segment 128 can define a shoulder 128*s* that has an inner diameter that is about the same or within about +10% or less of a diameter of the cable (with the jacket 64) to provide bending resistance/support structure to the cable 60 and can surround a segment of the jacket 64 of the cable 60.

The receiving channel 150 can have threads 151 on an inner surface thereof that threadably engage the threads 125 of the second member 120. However, it is contemplated that other embodiments can use a frictional attachment of the second member 120 to the housing 50*h* without requiring threads 151 or 125.

The second segment 126 can reside intermediate of the first and third segments and can comprise external clamping surfaces 127. The clamping surfaces 127 can comprise a plurality of circumferentially spaced apart external flat surfaces for allowing users to clamp against these surfaces to turn the second member 120 to threadably advance into a receiving channel 150 having threads 151 that matably engage the threads 125 of the second member 120.

The second member 120 can slidably receive a subsegment of the cable 60 through the open channel 122. The second member 120 can be configured to position the jacket 64 in the third segment 128 of the second member 120 and position the end portion 61*e* of the outer conductor 61 outside the first segment 124 of the second member, adjacent to and facing the first member 100 (FIG. 5).

Figure 7:
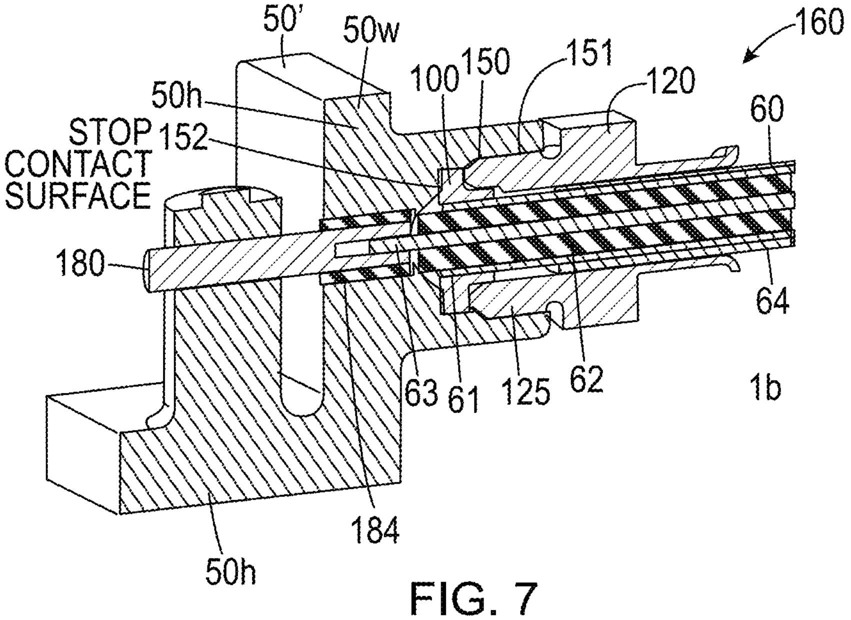
FIG. 7 is a section view of the device shown in FIG. 6.
Figure 8:
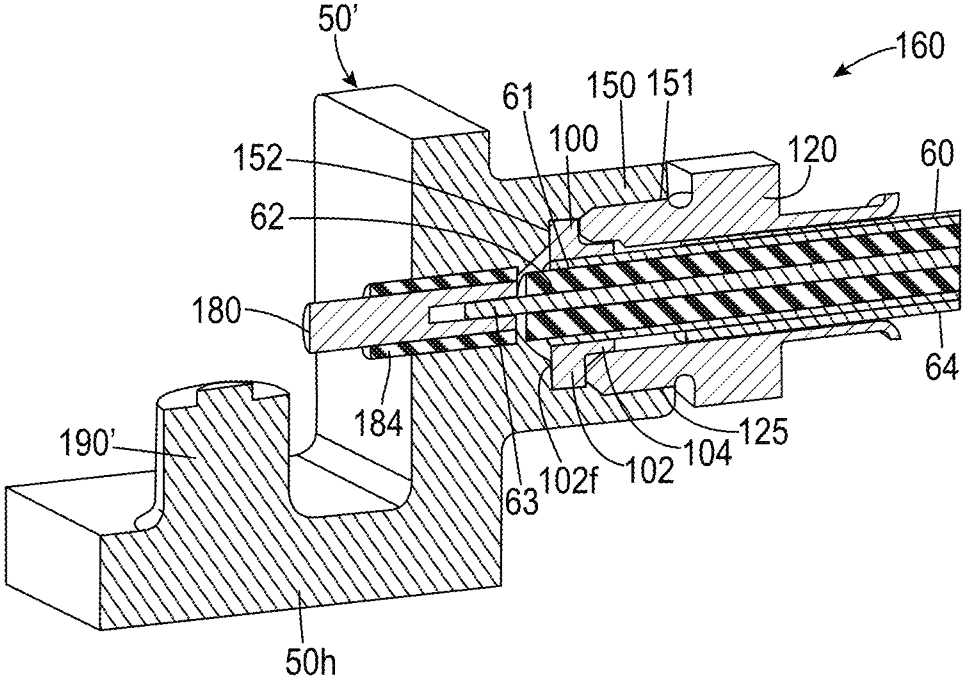
FIG. 8 is a section view of a similar device to that shown in FIG. 7, but shown with an alternate internal connection interface according to embodiments of the present invention.

Referring to FIGS. 4, 7 and 8, at least a portion of the second member 120 can couple to a receiving channel 150 of a housing 50*h*. The second member 120 can be configured to have different positons with respect to the first member 100. A first position is shown in FIG. 5 where the second member 120 can float axially relative to the first member 100. A second position in a fully assembled configuration is shown in FIGS. 7 and 8 whereby the second member 120 is closer to the first member 100 and the second segment 104 of the first member 100 is slidably received into a facing end portion of the second member 120. Thus, the second member 120 can travel toward the first member 100 when coupled to the receiving channel 150 of the housing 50 as the second member 120 is advanced into the receiving channel 150.

The (free) end portion 63*e* of the inner conductor 63 can define a connection pin 63*p* that extends into a channel 182 of a center conductor 180 (FIG. 7) in a housing 50*h* aligned with an axially extending centerline of the receiving channel 150. The free end 63*e* or pin 63*p* can have a length that is in a range of about 1 mm to about 70 mm.

Figure 6:
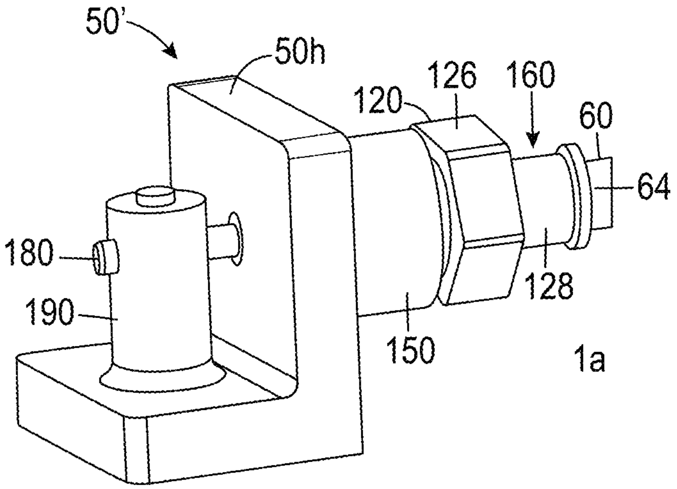
FIG. 6 is a side perspective view of the connector assembly shown in FIGS. 4 and 5, shown coupled to a channel of the housing and an internal connection interface (only a portion of the housing is shown) according to embodiments of the present invention.

Referring to FIGS. 6-8, the receiving channel 150 can have a stop surface 152 that is flat to abut the flat end face 102*f* of the first member 100. The stop surface 152 can be a flat annular stop surface. The first member 100 is pressed forward against the stop surface 152 by the second member 120 when the second member 120 is (threadably) coupled to (the threads 151 of) the receiving channel 150. Thus, when assembled, the first member 100 and the second member 120 can be physically coupled to the receiving channel 150.

The receiving channel 150 can be formed into an outer wall 50*w* of the housing 50*h* or be provided by a cylindrical coupler that is attached to the outer wall 50*w*. The receiving channel 150 can project outward from the outer wall 50*w* or be flush or even extend inward of the outer wall (not shown).

Referring to FIGS. 6-8, the free end 63*e* of the inner conductor 63 can engage a center conductor 180. The center conductor 180 can be axially aligned with the receiving channel 150. The center conductor 180 can comprise an annular dielectric spacer 184 that surrounds the center conductor 180. The center conductor 180 is electrically conductive and can comprise gold or other suitable conductive material. The free end 63*e* of the inner conductor 63 can slidably extend into a longitudinally extending channel 182 of the center conductor 180. The channel 182 can terminate a short distance in front of the tip of the free end of the inner conductor 63.

The free end 63*e* of the inner conductor 63 can frictionally engage the center conductor 180 to define a solder free electrical connection therewith. In other embodiments, the free end 63*e* may be soldered to the center conductor 180 (not shown).

The center conductor 180 can be soldered to a strip line (not shown). FIGS. 6 and 7 illustrate the center conductor 180 held by a boss 190 and the center conductor 180 can electrically couple to a strip line of an RF filter, such as a transmission line.

FIG. 8 illustrates am embodiment where no boss is provided and a separate (RF filter) strip line can be used where the center conductor 180 can be soldered.

Where soldered connections are used, a bismuth-tin-silver solder paste, tin-silver-copper solder paste or alternate preform solder material can be used.

Figure 9:
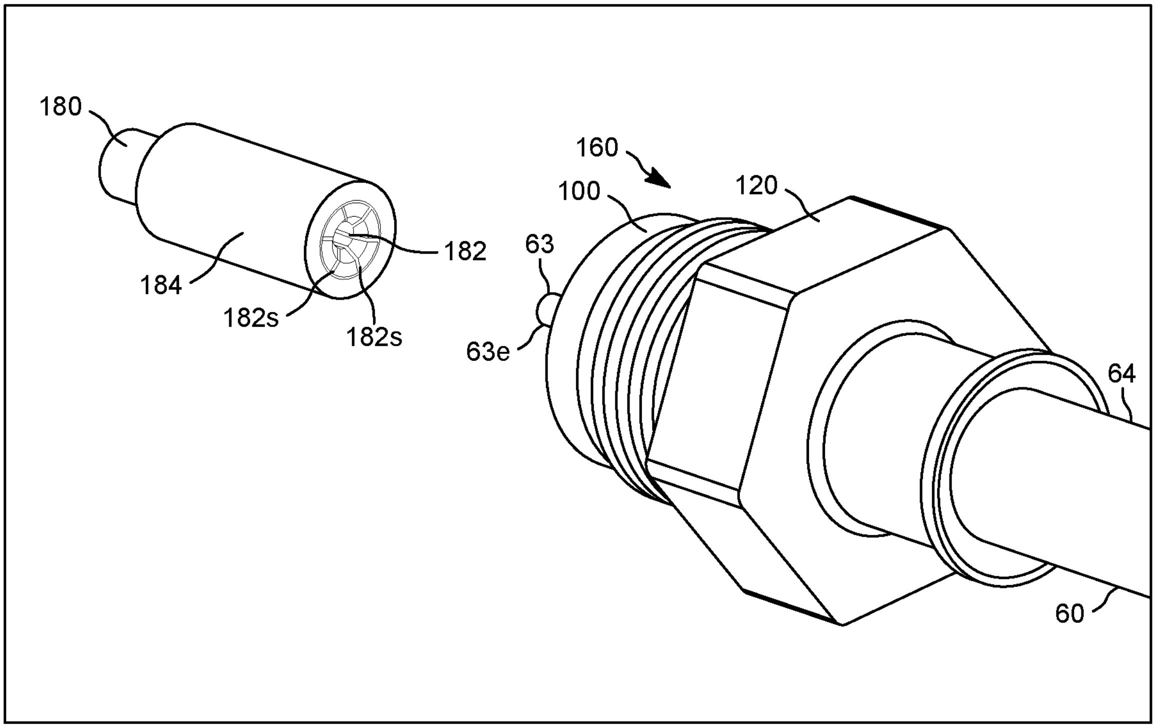
FIG. 9 is an exploded view of a distal end portion of the cable with the connector assembly aligned with an internal connection interface for the inner conductor according to embodiments of the present invention.
Figure 10:
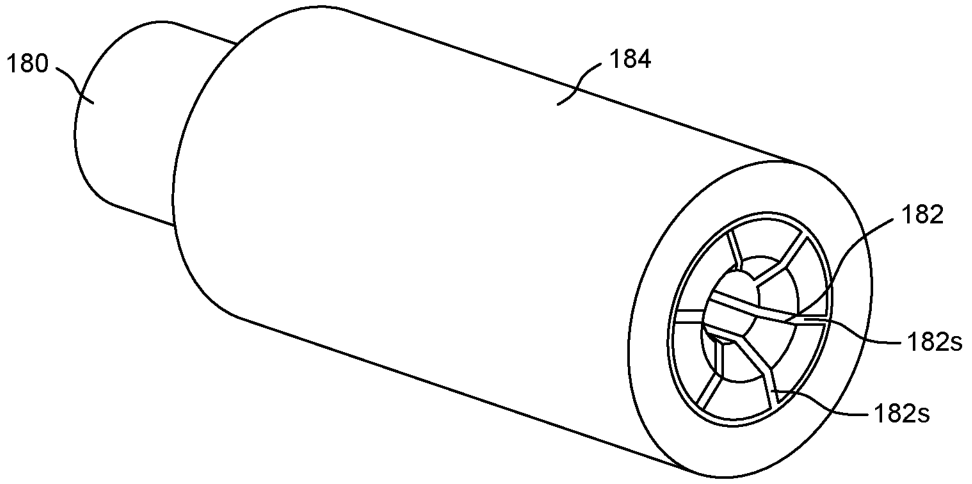
FIG. 10 is an enlarged side perspective view of the internal connection interface shown in FIG. 9.

Referring to FIGS. 9 and 10, the connector assembly 160 can be aligned with the center conductor 180 which can be held in the annular dielectric spacer 184. The center conductor 180 can define a longitudinally extending internal channel 182 with a plurality of radially and longitudinally extending, circumferentially spaced apart slits 182*s*. The slits 182*s* can be sized and configured to snugly receive the free end 63*e* of the inner conductor 63 and provide abutting contact between the inner conductor 63 and the center conductor 180. The inner conductor 63 can frictionally engage the center conductor 180.

The connector assemblies 160 can allow cables 60 to be replaced, such as when damaged, by simply unscrewing the second member 120 from the receiving channel 150 and pulling the cable 60 with the first member 100 out of the receiving channel 150.

The connector assemblies 160 can reduce the number of soldering events needed to attach or detach a cable that may reduce damage caused to cables and/or other components by those successive heating events.

Embodiments of the invention can allow filter units 50' to be tested using standardized test cables without requiring unit specific cables/attachments. Filter units 50' passing these tests can then be assembled to other corresponding cables 60 with the connector assemblies 160 at an OEM facility or at a field site.

The cables 60 can be manufactured and shipped with the connector assemblies 160 pre-attached for installation at a field site. The cables 60 can be assembled with respective first members 100, typically soldered together, and slidably mounted second members 120 produced in production batches to have respective connector assemblies 160 attached at a production facility as soldering to specific filter units is not required.

Figure 11:
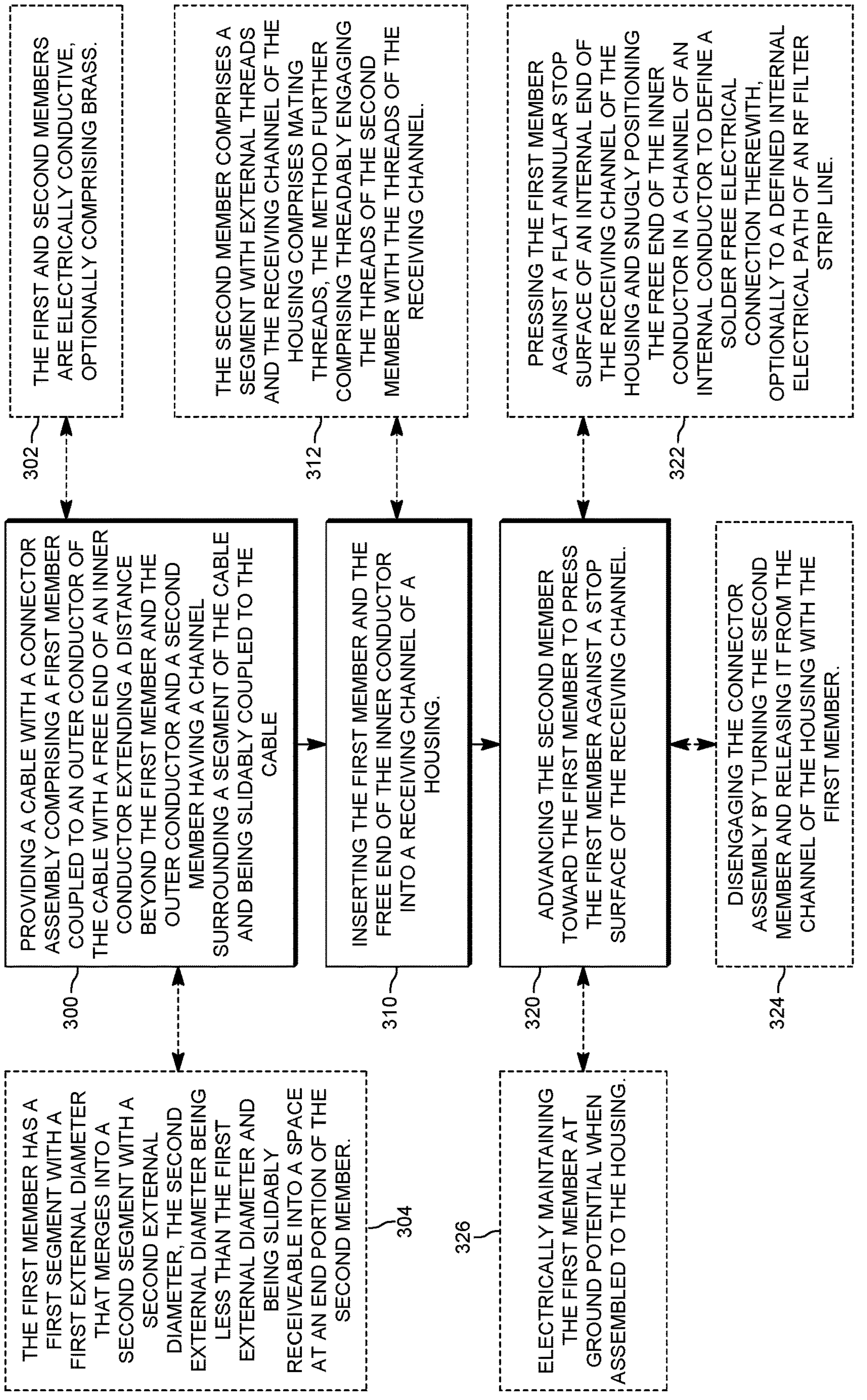
FIG. 11 is a flow chart of actions that can be used to detachably couple a coaxial cable to a housing according to embodiments of the present invention.

Turning now to FIG. 11, a flow chart of example actions that can be used to attach a cable to a target housing is illustrated (broken lines indicate optional steps). A cable with a connector assembly is provided. The connector assembly comprises a first member coupled to an outer conductor of the cable with a free end of an inner conductor extending a distance beyond the first member and the outer conductor and a second member having a channel surrounding a segment of the cable, and being slidably coupled to the cable (block 300). The first member and the free end of the inner conductor are inserted into a receiving channel of a housing (block 310). The second member is advanced toward the first member to press the first member against a stop surface of the receiving channel (block 320).

The first and second members are electrically conductive, optionally comprising brass (block 302).

The second member can comprise a segment with external threads and the receiving channel of the housing comprises mating threads, the method can further comprise threadably engaging the threads of the second member with the threads of the receiving channel (block 312).

The first member can be pressed against a flat annular stop surface of an internal end of the receiving channel of the housing in response to the advancing step and this can snugly position the free end of the inner conductor in an open channel of a center conductor to define a solder free electrical connection therewith, optionally to a defined internal electrical path of an RF filter strip line (block 322).

The connector assembly can be disengaged from the receiving channel by turning the second member and releasing it from the receiving channel of the housing with the first member (block 324).

The first member can have a first segment with a first external diameter that merges into a second segment with a second external diameter, the second external diameter being less than the first external diameter and being slidably receivable into an interior space at an end portion of the second member (block 304).

The first member can be electrically maintained at ground potential when assembled to the housing (block 326).

Figure 12:
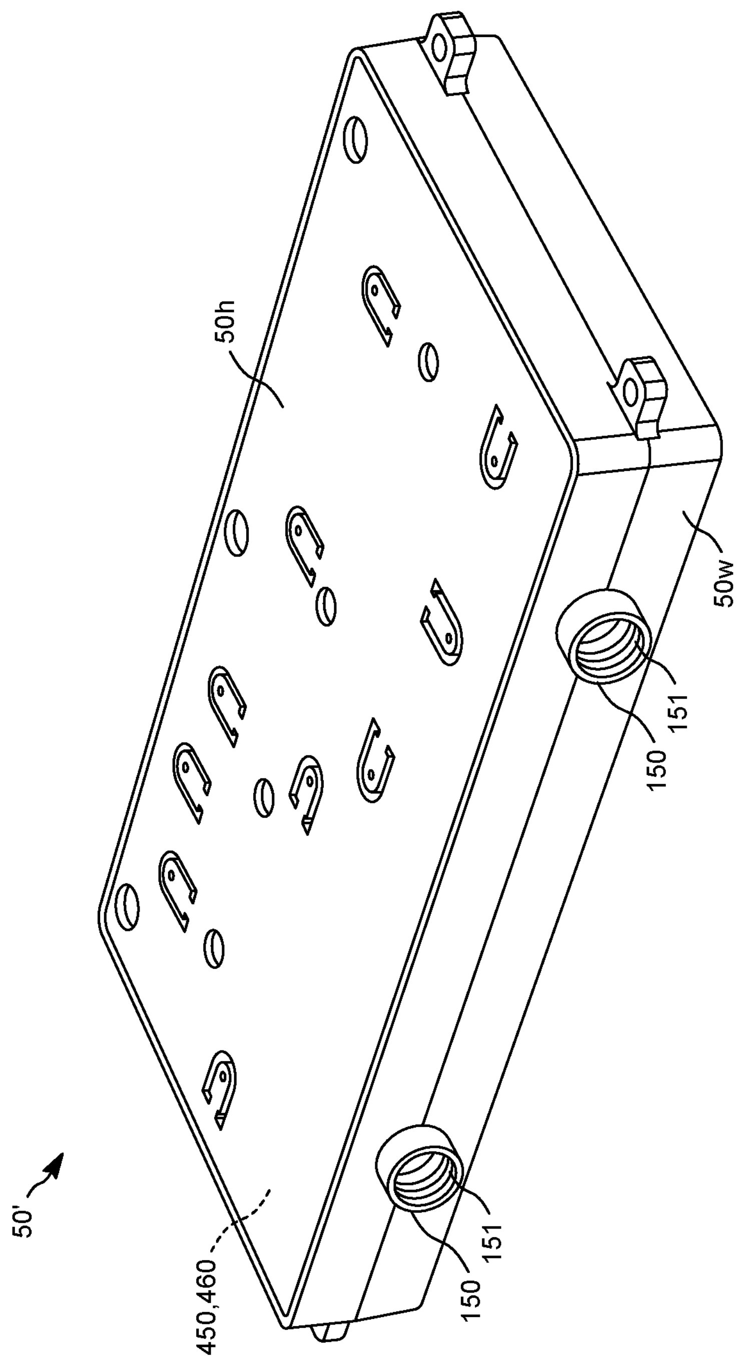
FIG. 12 is a perspective view of an example filter unit according to embodiments of the present invention.

Turning now to FIG. 12, an example filter unit 50' is shown. The filter unit 50' can comprise a plurality of resonator plates that are mounted within a housing to realize a resonant cavity RF filter. As shown, the filter unit 50' includes a housing 50*h*. First and second resonator plates 450, 460 can be mounted within the housing 50*h*. The resonator plates may be mounted in a stacked relationship. The resonator plates may be fixed to the housing by continuous solder joints and/or may be die cast integrally with other elements of the housing to provide very high levels of RF and PIM distortion performance. In some embodiments, the filter assemblies 50' may comprise three port devices such as RF duplexers or diplexers and one or more can comprise a receiving channel 150 that can comprise threads 151 that can releasably engage a connector assembly 160. In other embodiments, the filter units 50' may include additional ports to implement multiplexers, triplexers, combiners or the like. See, U.S. Pat. No. 10,050,323 for additional discussions of example filter assemblies, the contents of which are hereby incorporated by reference as if recited in full herein. Other filter unit configurations may be used.

Example filter units 50' according to embodiments of the present invention may include, for example, two or more ports that are used to electrically connect the filter unit 50' to other external devices. These ports may include "individual" ports, which refer to ports that are only intended to carry signals having frequencies in specific ranges, and "common" ports, which are intended to carry signals having frequencies in multiple of the specific ranges. For example, when a filter unit/filter assembly according to embodiments of the present invention is a duplexer, the filter assembly will include a first individual port that connects to a transmit path, a second individual port that connects to a receive path, and a common port that connects to a radiating element such as a radiating element of a phased array antenna. In some embodiments, the individual and common ports may be, for example, implemented as coaxial connector ports that are designed to mate with a connector assembly 160 of a coaxial cable 60. In such embodiments, the inner conductors 63 of each cable maybe connected via the center conductor 180 to one of the resonator plates and the outer conductor 61 of each cable may be connected to the housing 50*h*.

The resonator plates 450, 460 may each comprise, for example, substantially planar metal plates. The resonator plates 450, 460 may only be "substantially" planar as they may include, for example, non-planar features such as tuning stubs that may be bent upwardly or downwardly to tune the response of the filter assembly 50'. Each resonator plate 450, 460 may be formed of, for example, copper or a copper alloy, although other metals may be used Embodiments of the invention couple the cables 60 with the connector assemblies 160 using a respective receiving channel 150 to provide highly consistent metal-to-metal connections. As is known in the art, Passive Intermodulation ("PIM") distortion may occur when two or more RF signals encounter non-linear electrical junctions or materials along an RF transmission path. Such non-linearities may act like a mixer causing new RF signals to be generated at mathematical combinations of the original RF signals. If the newly generated RF signals fall within the bandwidth of existing RF signals, the noise level experienced by those existing RF signals is effectively increased. When the noise level is increased, it may be necessary reduce the data rate and/or the quality of service. PIM distortion can be an important interconnection quality characteristic for an RF communications system, as PIM distortion generated by a single low quality interconnection may degrade the electrical performance of the entire RF communications system. Thus, ensuring that components used in RF communications systems will generate acceptably low levels of PIM distortion may be desirable.

It should also be noted that in addition to PIM distortion, inconsistent metal-to-metal connections may give rise to reflections in an RF communications system, which increase the return loss along the RF transmission path. Devices that have such inconsistent metal-to-metal connections may therefore exhibit increased insertion loss values. By using the solderless, press-fit connection of the first member 100 against a metal contact stop surface 152, the filter units 50' according to embodiments of the present invention may exhibit satisfactory insertion loss performance without requiring soldering.

It will be appreciated that cables 60 with connector assemblies 160 according to embodiments of the present invention may be used to implement a wide variety of different devices including duplexers, diplexers, multiplexers, combiners and the like. It will also be appreciated that the cables 60 with the connector assemblies 160 according to embodiments of the present invention may also be used in applications other than cellular communications systems.

The present invention has been described above with reference to the accompanying drawings, in which certain embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A filter unit comprising:

a housing comprising a receiving channel with a stop surface that is electrically conductive; and a cable comprising a connector assembly on a first end portion, the first end portion comprising an end portion of an inner conductor having a free end, an end portion of an outer conductor terminating a distance rearward of the end portion of the inner conductor, and an end portion of a dielectric residing between the inner conductor and the outer conductor, the connector assembly comprising:

a first member comprising an open channel, the first member coupled to the end portion of the outer conductor with the free end of the inner conductor and the end portion of the dielectric extending through the open channel to reside forward of the first member, wherein the outer conductor is spaced apart from the stop surface, and wherein the first member abuts the stop surface; and a second member that is rearward of the first member and comprises an open channel that slidably receives the cable, wherein the second member is detachably coupled to the first member and the first member at least partially resides in the receiving channel of the housing while also coupled to the second member, and wherein, when fully assembled to the housing, the second member presses the first member against the stop surface.

2. The filter unit of claim 1, wherein the first member is devoid of internal and external threads and comprises a first segment with an annular flat end face that merges into a second segment comprising a neck which defines a rearward end of the first member, wherein the second member defines an annular space about the end portion of the outer conductor, and wherein the neck of the first member is sized and configured to reside in the annular space.

3. The filter unit of claim 1, wherein the first member is devoid of external threads and has a disk shaped forward segment that merges rearwardly into a smaller diameter neck that defines a rearward end of the first member, wherein the second member comprises a first segment with external threads, wherein the at least one receiving channel comprises an internal surface with threads that threadably engage the external threads of the first segment of the second member to thereby define a releasably detachable solderless coupling of the second member to the receiving channel, and wherein the disk shaped forward segment of the first member is forward of the second member and rearward of the outer conductor and jacket of the first end portion of the coaxial cable.

4. The filter unit of claim 1, wherein the first member and the second member of the connector assembly are electrically conductive, and wherein the first end portion of the coaxial cable defines first, second, third and fourth axially spaced apart stepped segments at the first end portion of the cable with decreasing respective different outer diameters, with the first segment defined by an outer jacket extending about the outer conductor, the dielectric and the inner conductor, with the second segment defined by the outer conductor surrounding the dielectric and inner conductor and extending forward of the first segment to the end portion of the outer conductor, with the third segment defined by the dielectric surrounding the inner conductor and extending forward of the second segment to the end portion of the dielectric, and with the fourth segment defined by the inner conductor extending forward of the third segment to the free end of the inner conductor.

5. The filter unit of claim 4, wherein the first member and the second member comprise brass.

6. The filter unit of claim 1, further comprising a center conductor in the housing that is elongate and aligned with the receiving channel and that is electrically and physically connected to the free end of the inner conductor to thereby define a solderless connection therebetween.

7. The filter unit of claim 6, wherein the center conductor has a longitudinally extending body with opposing first and second end portions, the first end portion comprising a channel with longitudinally and radially extending slits that are circumferentially spaced apart.

8. The filter unit of claim 7, wherein the channel of the center conductor terminates in the longitudinally extending body before the second end portion.

9. The filter unit of claim 6, further comprising an annular dielectric in the housing, surrounding at least a portion of the center conductor and the free end of the inner conductor.

10. The filter unit of claim 1, wherein the second member comprises first, second and third segments that are axially spaced apart and that surround the open channel of the second member, the first segment comprising external threads and being forward of the second and third segments, the second segment comprising a plurality of circumferentially spaced apart flat clamping surfaces, and the third segment comprising a cylindrical shoulder residing over the first segment of the first end portion of the cable to surround the outer jacket.

11. The filter unit of claim 1, wherein the stop surface is at an inner end portion of the receiving channel, wherein the stop surface abuts only a forward end of the first member with the outer conductor positioned behind the stop surface and the stop surface surrounds an open longitudinally extending channel that extends a distance inwardly thereof to position the free end of the inner conductor inside a center conductor held therein.

12. A cable assembly, comprising:

a coaxial cable comprising an inner conductor, an outer conductor, a dielectric between the inner conductor and the outer conductor and an outer jacket surrounding the outer conductor over a length of the coaxial cable, wherein the coaxial cable comprises a first end portion configured with an end portion of an inner conductor having an exposed free end, an end portion of an outer conductor terminating a distance rearward of the end portion of the inner conductor, and an end portion of a dielectric residing axially between the end portion of the inner conductor and the end portion of the outer conductor and terminating a distance rearward of the end portion of the inner conductor; and a connector assembly coupled to the first end portion of the coaxial cable, the connector assembly comprising:

a first member comprising an open channel, the first member coupled to the end portion of the outer conductor with the free end of the inner conductor and the end portion of the dielectric extending through the open channel to reside forward of the first member and with an end of the end portion of the outer conductor terminating at or rearward of a forward end of the first member; and a second member residing rearward of the first member and comprising an open channel that slidably receives a rearwardly positioned portion of the first member and the first end portion of the coaxial cable and moves axially relative to the first member between installed and uninstalled positions.

13. The cable assembly of claim 12, wherein the first member is devoid of internal and external threads, wherein the first member comprises a first segment with an annular flat end face and merges into a second segment comprising a neck defining a rearward end of the first member, wherein the second member defines an annular space that extends about the end portion of the outer conductor, and wherein the neck of the first member is sized and configured to reside in the annular space.

14. The cable assembly of claim 12, wherein the first member is devoid of external threads and has a disk shaped forward segment that merges rearwardly into a smaller diameter neck that defines a rearward end of the first member that slidably engages a conductive stop surface in a target device, and wherein the second member comprises a first segment at a forward end thereof with external threads to thereby define a releasably detachable solderless coupling of the second member to a threaded receiving channel in a target device and that forces the first member against a stop surface therein.

15. The cable assembly of claim 12, wherein the first member and the second member of the connector assembly are electrically conductive.

16. The cable assembly of claim 15, wherein the first member and the second member comprise brass.

17. The cable assembly of claim 12, wherein the second member comprises first, second and third segments surrounding the open channel of the second member, the first segment residing forward of the second and third segments and comprising external threads and residing about the end portion of the outer conductor, the second segment comprising a plurality of circumferentially spaced apart flat clamping surfaces, and the third segment comprising a cylindrical shoulder enclosing a segment of the outer jacket of the cable.

18. A method of attaching a cable to a target device, comprising:

providing a cable with a connector assembly on an end portion thereof, the connector assembly comprising a first member that is electrically conductive and coupled to an outer conductor and defining an open channel that surrounds an end portion of a dielectric and an end portion of an inner conductor with a free end of the inner conductor extending forward thereof whereby the first end portion of the cable defines first, second, third and fourth axially spaced apart stepped segments at the first end portion of the cable with decreasing respective different outer diameters, with the first segment defined by an outer jacket extending about the outer conductor, the dielectric and the inner conductor, with the second segment defined by the outer conductor surrounding the dielectric and inner conductor and extending forward of the first segment to the end portion of the outer conductor, with the third segment defined by the dielectric surrounding the inner conductor and extending forward of the second segment to the end portion of the dielectric, and with the fourth segment defined by the inner conductor extending forward of the third segment to the free end of the inner conductor, and also comprising a second member that is electrically conductive, positioned behind the first member, slidably coupled to the end portion of the cable;

inserting the first member into a receiving channel of a target device;

advancing the second member toward the first member in the receiving channel; and forcing the second member to abut the first member and press the first member against a stop surface in the receiving channel while the outer conductor is spaced apart from the stop surface to define an electrical ground connection with the target device.

19. The method of claim 18, wherein the receiving channel has an inner surface with threads, wherein the second member has external threads, and wherein the advancing is carried out to threadably engage the threads of the receiving channel and the threads of the second member to couple the second member to the target device and force the second member to abut the first member.

20. The method of claim 18, wherein the target device is a filter unit of a communications system.

* * * * *